US012713476B2

(12) United States Patent
Dai et al.

(10) Patent No.: US 12,713,476 B2
(45) Date of Patent: Aug. 18, 2026

(54) METHOD AND APPARATUS FOR MULTICAST AND BROADCAST SERVICES

(71) Applicant: LENOVO (BEIJING) LIMITED, Beijing (CN)

(72) Inventors: Mingzeng Dai, Shanghai (CN); Haiming Wang, Beijing (CN); Lianhai Wu, Beijing (CN)

(73) Assignee: Lenovo (Beijing) Limited, Beijing (CN)

(*) Notice: Subject to any disclaimer, the term of this patent is extended or adjusted under 35 U.S.C. 154(b) by 527 days.

(21) Appl. No.: 18/040,653

(22) PCT Filed: Aug. 6, 2020

(86) PCT No.: PCT/CN2020/107426
§ 371 (c)(1),
(2) Date: Feb. 6, 2023

(87) PCT Pub. No.: WO2022/027443
PCT Pub. Date: Feb. 10, 2022

(65) Prior Publication Data
US 2023/0319909 A1 Oct. 5, 2023

(51) Int. Cl.
*H04W 76/12* (2018.01)
*H04W 76/20* (2018.01)

(52) U.S. Cl.
CPC ........... *H04W 76/12* (2018.02); *H04W 76/20* (2018.02)

(58) Field of Classification Search
CPC ..... H04W 76/12; H04W 76/20; H04W 76/40; H04W 76/11; H04W 4/06
See application file for complete search history.

(56) References Cited

U.S. PATENT DOCUMENTS

| | | | | |
|---|---|---|---|---|
| 2012/0140778 | A1 | 6/2012 | Wang et al. | |
| 2018/0343659 | A1 | 11/2018 | Hahn et al. | |
| 2020/0275498 | A1* | 8/2020 | Fiorani | H04W 76/11 |
| 2021/0168570 | A1* | 6/2021 | Navratil | H04W 72/30 |
| 2021/0378053 | A1* | 12/2021 | Saily | H04W 76/40 |
| 2022/0377508 | A1* | 11/2022 | Ma | H04W 76/12 |
| 2022/0417907 | A1* | 12/2022 | Xiong | H04W 72/30 |

(Continued)

FOREIGN PATENT DOCUMENTS

| | | |
|---|---|---|
| CN | 101163260 A | 4/2008 |
| CN | 101998263 A | 3/2011 |

(Continued)

OTHER PUBLICATIONS

China National Intellectual Property Administration, PRC Patent Application No. 202080103108.7, Office Action, Jul. 30, 2024.

(Continued)

*Primary Examiner* — Yemane Mesfin
*Assistant Examiner* — Guoxing Fan
(74) *Attorney, Agent, or Firm* — Isidore PLLC

(57) ABSTRACT

Embodiments of the present application relate to a method and apparatus for multicast and broadcast services (MBS). An exemplary method includes: transmitting a bearer context identity (ID) to identify a tunnel for a radio bearer (RB) and associate the tunnel with at least one of: a multicast data radio bearer (M-DRB); and at least one unicast data radio bearers (U-DRB). Embodiments of the present application can support multiple transmission modes, for example, the SC-PTM mode, the MC-PTM mode, and the unicast mode.

20 Claims, 7 Drawing Sheets

(56) References Cited

U.S. PATENT DOCUMENTS

2023/0011492 A1* 1/2023 Åkesson ............... H04W 76/40
2023/0025793 A1* 1/2023 Xiong ............... H04W 36/0007
2023/0053835 A1* 2/2023 Byun ...................... H04W 4/06
2023/0065098 A1* 3/2023 Byun ...................... H04W 4/06
2023/0081286 A1* 3/2023 Liang ................ H04W 36/0007 370/331
2023/0099930 A1* 3/2023 Xin ....................... H04W 76/10 370/329
2023/0110505 A1* 4/2023 Wang ........................ H04L 1/08 370/331
2023/0171845 A1* 6/2023 Ma ........................ H04W 76/12 370/312
2023/0276470 A1* 8/2023 Di Girolamo .......... H04W 4/06 370/312
2023/0292219 A1* 9/2023 Byun .................. H04W 40/246
2023/0354106 A1* 11/2023 Godin ................... H04W 76/40
2023/0362960 A1* 11/2023 Adjakple ................ H04W 4/08

FOREIGN PATENT DOCUMENTS

CN 110856223 A 2/2020
WO 2013023864 A1 2/2013
WO 2015144251 A1 10/2015
WO 2016161655 A1 10/2016
WO 2020035795 A1 2/2020

OTHER PUBLICATIONS

Japan Patent Office, Japanese Patent Application No. 2023-508001, Notice of Allowance dated Dec. 9, 2024.

Ericsson, "KI#1, Sol#3: Update to add ENs", SA WG2 Meeting #139E, S2-2003702, Jun. 1-12, 2020, Electronic, Elbonia.

Nokia, Nokia Shanghai Bell, Huawei, HI Silicon, China Mobile, "KI #1, Sol #3: Update to address editor's notes", SA WG2 Meeting #139E, S2-2004707, Electronic meeting, Jun. 1-12, 2020.

Patent Cooperation Treaty (PCT) International Application No. PCT/CN2020/107426, International Search Report and Written Opinion, Apr. 30, 2021.

3rd Generation Partnership Project (3GPP) TR 23.757 V04.0, Study on architectural enhancements for 5G multicast-broadcast services (Release 17) (Jun. 22, 2020).

China Patent Office, PRC China Patent Application No. 202080103108.7, Office Action dated Dec. 27, 2024.

* cited by examiner

METHOD AND APPARATUS FOR MULTICAST AND BROADCAST SERVICES

TECHNICAL FIELD

Embodiments of the present application generally relate to wireless communication technology, especially to a method and apparatus for multicast and broadcast services (MBS).

BACKGROUND

In new radio (NR) Rel-17, the MBS plans to focus on a small area mixed mode multicast (also referred to as Objective Ain the TR 23.757). The Objective A is about enabling general MBS services over 5G system (5GS) and the identified use cases that could benefit from this feature. These use cases include but are not limited to: public safety and mission critical, vehicle to everything (V2X) applications, transparent internet protocol version 4 (IPv4)/internet protocol version 6 (IPv6) multicast delivery, internet protocol television (IPTV), software delivery over wireless, group communications and internet of things (IoT) applications. In these use cases, the requirements for service continuity and reliability have changed. In order to support the above requirements, one objective introduced in RP-201038 is: specify support for dynamic change of Broadcast/Multicast service delivery between multicast (for example, point to multipoint (PTM) mode) and unicast (for example, point to point (PTP) mode) with service continuity for a given user equipment (UE).

Given the above, the industry desires an improved technology for multicast and broadcast services, so as to support multiple transmission modes, for example, single cell PTM (SC-PTM) mode, multi-cell PTM (MC-PTM) mode, and unicast mode (i.e., PTP mode).

SUMMARY OF THE APPLICATION

Some embodiments of the present application at least provide a technical solution for multicast and broadcast services.

According to some embodiments of the present application, a method may include: transmitting a bearer context identity (ID) to identify a tunnel for a radio bearer (RB) and associate the tunnel with at least one of: a multicast data radio bearer (M-DRB); and at least one unicast data radio bearers (U-DRB).

According to some other embodiments of the present application, a method may include: receiving a bearer context ID to identify a tunnel for a RB and associate the tunnel with at least one of: an M-DRB; and at least one U-DRB.

According to some other embodiments of the present application, a method may include: transmitting a bearer context ID to a central unit user plane (CU-UP) unit, wherein the bearer context ID is used to identify a tunnel for the RB and associate the tunnel with at least one of: an M-DRB; and at least one U-DRB.

According to some other embodiments of the present application, a method may include: receiving a bearer context ID from a central unit control plane (CU-CP) unit, wherein the bearer context ID is used to identify a tunnel for the RB and associate the tunnel with at least one of: an M-DRB; and at least one U-DRB.

Some embodiments of the present application also provide an apparatus that includes: at least one non-transitory computer-readable medium having computer executable instructions stored therein, at least one receiver; at least one transmitter; and at least one processor coupled to the at least one non-transitory computer-readable medium, the at least one receiver and the at least one transmitter. The computer executable instructions are programmed to implement any method as stated above with the at least one receiver, the at least one transmitter and the at least one processor.

Embodiments of the present application provide a technical solution for multicast and broadcast services. Accordingly, embodiments of the present application can support multiple transmission modes, for example, the SC-PTM mode, the MC-PTM mode, and the unicast mode.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed description of the appended drawings is intended as a description of the currently preferred embodiments of the present application and is not intended to represent the only form in which the present application may be practiced. It is to be understood that the same or equivalent functions may be accomplished by different embodiments that are intended to be encompassed within the spirit and scope of the present application.

Reference will now be made in detail to some embodiments of the present application, examples of which are illustrated in the accompanying drawings. To facilitate understanding, embodiments are provided under specific network architecture and new service scenarios, such as 3GPP 5G, 3GPP LTE Release 8 and so on. Persons skilled in the art know very well that, with the development of network architecture and new service scenarios, the embodiments in the present application are also applicable to similar technical problems.

Figure 1:
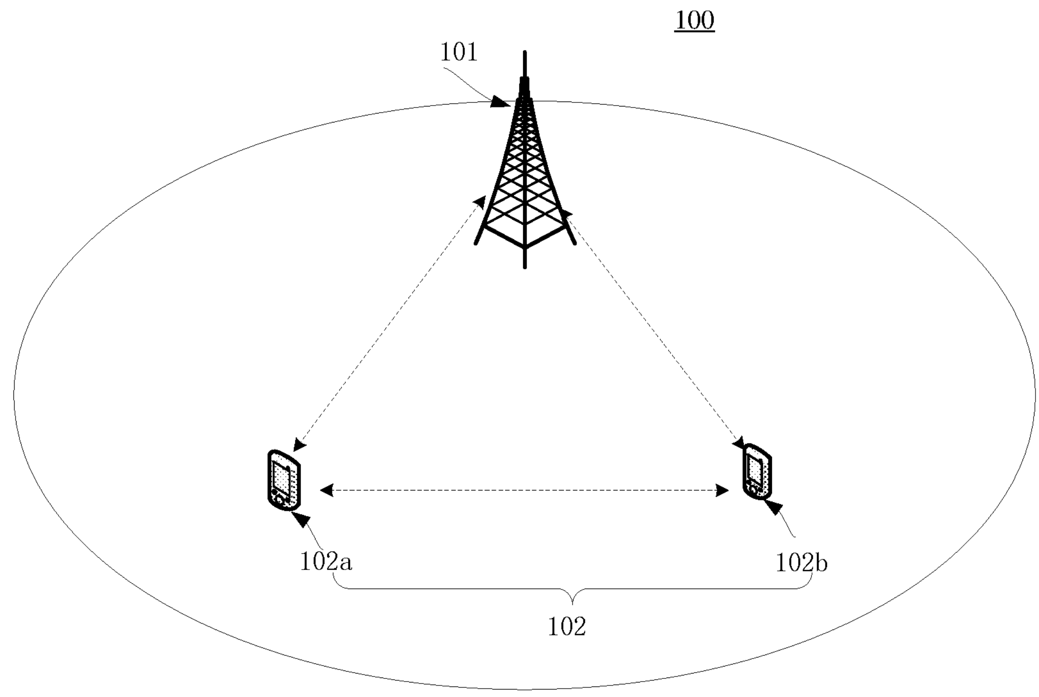
FIG. 1 is a schematic diagram illustrating an exemplary wireless communication system 100 according to some embodiments of the present application.

FIG. 1 is a schematic diagram illustrating an exemplary wireless communication system 100 according to an embodiment of the present application.

As shown in FIG. 1, a wireless communication system 100 includes at least one BS 101 and at least one UE 102. In particular, the wireless communication system 100 includes one BS 101 and two UEs 102 (e.g., a UE 102*a* and UE 102*b*) for illustrative purpose. Although a specific number of BS 101 and UEs 102 are depicted in FIG. 1, it is contemplated that any number of BSs 101 and UEs 102 may be included in the wireless communication system 100.

The BS 101 may also be referred to as an access point, an access terminal, a base, a macro cell, a node-B, an enhanced node B (eNB), a gNB, a home node-B, a relay node, or a device, or described using other terminology used in the art. The BS 101 is generally part of a radio access network that may include a controller communicably coupled to the BS 101.

The UE(s) 102 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to an embodiment of the present application, the UE 102(*s*) may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments, the UE 102(*s*) may include wearable devices, such as smart watches, fitness bands, optical head-mounted displays, or the like. Moreover, the UE 102(*s*) may be referred to as a subscriber unit, a mobile, a mobile station, a user, a terminal, a mobile terminal, a wireless terminal, a fixed terminal, a subscriber station, a user terminal, or a device, or described using other terminology used in the art.

The wireless communication system 100 is compatible with any type of network that is capable of sending and receiving wireless communication signals. For example, the wireless communication system 100 is compatible with a wireless communication network, a cellular telephone network, a time division multiple access (TDMA)-based network, a code division multiple access (CDMA)-based network, an orthogonal frequency division multiple access (OFDMA)-based network, an LTE network, a 3GPP-based network, a 3GPP 5G network, a satellite communications network, a high altitude platform network, and/or other communications networks.

Figure 2:
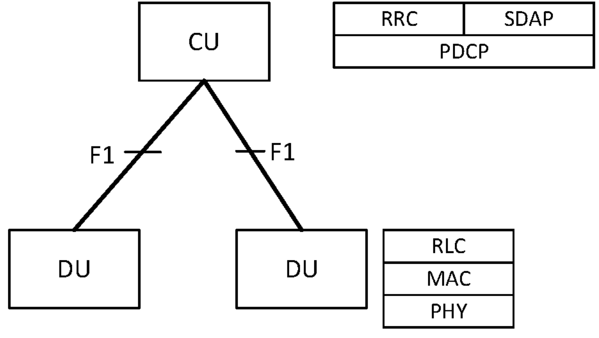
FIG. 2 is a schematic diagram illustrating an internal structure of a BS according to some embodiments of the present application.

FIG. 2 is a schematic diagram illustrating an internal structure of a BS according to some embodiments of the present application.

Referring to FIG. 2, the internal structure of a BS (e.g., BS 101) may be split into a central unit (CU) and at least one distributed unit (DU) (e.g., two DUs shown in FIG. 2). Although a specific number of DUs are depicted in FIG. 2, it is contemplated that any number of DUs may be included in the BS.

The CU and DU are connected with each other by an interface called F1 as specified in 3GPP standard documents. The radio resource control (RRC) layer functionality, service data adaptation protocol (SDAP) functionality, and the packet data convergence protocol (PDCP) layer functionality are included in the CU. The radio link control (RLC) layer functionality, medium access control (MAC) layer functionality, and the physical (PHY) layer functionality are included in the DU.

According to some embodiments of the present application, the CU may be separated into a CU-CP unit and at least one CU-UP unit. For example, FIG. 3 is a schematic diagram illustrating an internal structure of a BS according to some other embodiments of the present application.

Figure 3:
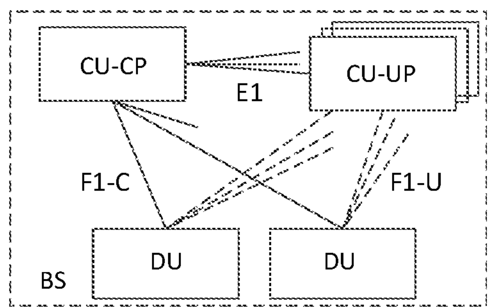
FIG. 3 is a schematic diagram illustrating an internal structure of a BS according to some other embodiments of the present application.

Referring to FIG. 3, the CU may be separated into a CU-CP unit and at least one CU-UP unit. The CU-CP unit and the CU-UP unit may be connected with each other by an interface called E1 as specified in 3GPP standard documents. The CU-CP unit and the DU are connected by an interface called F1-C as specified in 3GPP documents. The CU-UP unit and the DU are connected by an interface called F1-U as specified in 3GPP standard documents.

A BS may transmit data to different UEs in the same MBS. For example, the BS 101 may transmit data to the UE 102*a* and UE 102*b* in the same MBS in FIG. 1 via a SC-PTM mode or an MC-PTM mode. In another example, the MBS data may be respectively transmitted to the UE 102*a* and UE 102*b* via a unicast mode (i.e., PTP mode).

Given the above, 5G MBS needs to support multiple transmission modes, for example, the SC-PTM mode, MC-PTM mode, and a PTP mode. In addition, data transmission between the CU and DU also needs to be considered, so as to support the multiple transmission modes simultaneously.

Accordingly, embodiments of the present application provide a technical solution for MBS, which can support multiple transmission modes. In some embodiments of the present application, a shared (or common) tunnel is proposed such that the MBS data are transmitted via a single tunnel between the CU (or CU-CP) and the DU shared by SC-PTM mode, MC-PTM node, and the PTP mode. More details on embodiments of the present application will be illustrated in the following text in combination with the appended drawings.

Figure 4:
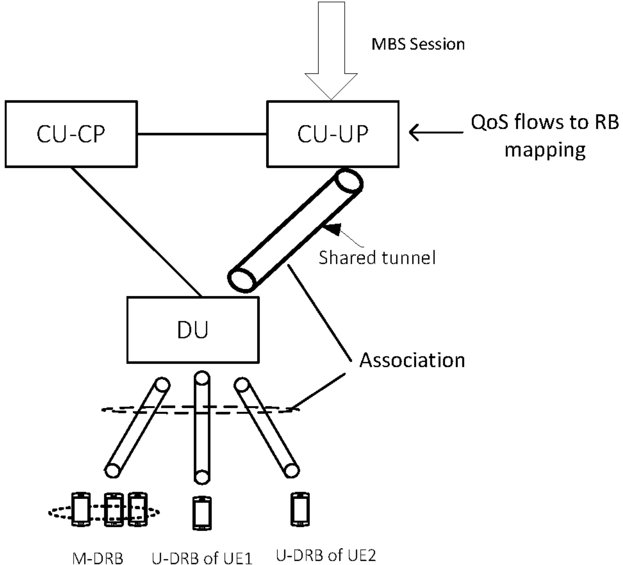
FIG. 4 is a schematic diagram illustrating a data transmission on a shared tunnel according to some embodiments of the present application.

FIG. 4 is a schematic diagram illustrating a data transmission on a shared tunnel according to some embodiments of the present application.

In the example of FIG. 4, the internal structure of a BS is split into a CU-CP unit, a CU-UP unit, and a DU. When an MBS session arrives at the CU-UP from the core network, the CU-UP may map the MBS session into one or more RBs. The mapping is performed by a QoS flow to RB mapping in the SDAP layer. For example, at least one QoS flow of the session may be mapped to a RB.

For each RB, a general packet radio service (GPRS) tunneling protocol (GTP) user plane (GTP-U) tunnel may be established between CU-UP and DU for data transmission via M-DRB, U-DRB of UE1 (for example, the UE 102*a*), and U-DRB of UE2 (for example, the UE 102*b*).

The M-DRB may refer to a radio bearer or an RLC bearer for data transmission via a PTM mode. The M-DRB is scrambled by a group radio network temporary identifier (G-RNTI) in at least one cell. The M-DRB can also be named as multicast radio bearer (MRB). The U-DRB may refer to a radio bearer or an RLC bearer for data transmission via a PTP mode. The U-DRB is scrambled by a cell radio network temporary identifier (C-RNTI). The U-DRB can also be named as data radio bearer (DRB). The M-DRB may refer to a radio bearer in a PTM mode while the U-DRB may refer to a radio bearer in a PTP mode.

Since the tunnel is used for data transmission via M-DRB, U-DRB of UE1, and U-DRB of UE2, the tunnel may be also referred to as a shared tunnel or a common tunnel, in some embodiments.

According to an embodiment of the present application, in order to use the shared tunnel, the same QoS flow to RB mapping procedure should be applied to M-DRB, U-DRB for UE1, and UE-DRB for UE2.

According to another embodiment of the present application, the shared tunnel may be specific for a DU (i.e., the shared tunnel is used for a DU), or specific for a broadcast area including a list of cells (i.e., the shared tunnel is used for a broadcast area) or specific for a cell (i.e., the shared tunnel is used for a cell).

After generating a tunnel for a RB, the DU may forward the data from the tunnel to the corresponding MRB and DRBs respectively. For example, when receiving a packet from the tunnel, the DU may duplicate the packet to obtain multiple packets, and transmit the multiple packets to MRB and DRBs associated with the tunnel respectively.

Figure 5:
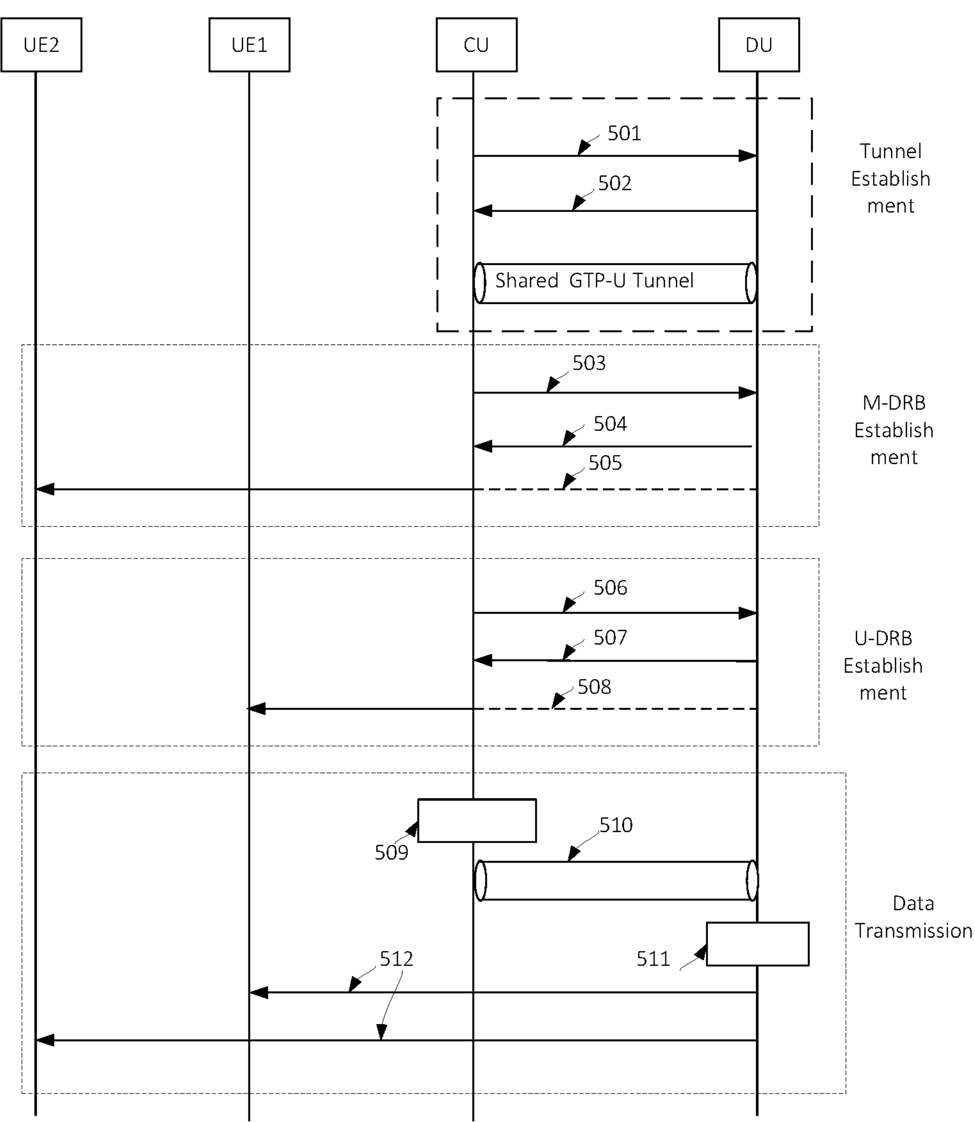
FIG. 5 is a flow chart illustrating a method for data transmission via a tunnel according to some other embodiments of the present application.

FIG. 5 is a flow chart illustrating a method for data transmission via a tunnel according to some other embodiments of the present application.

As shown in FIG. 5, the basic idea of a method for data transmission via a tunnel may include the following procedures: a tunnel establishment procedure between the CU and the DU, an M-DRB establishment procedure and/or a U-DRB establishment procedure, and a data transmission procedure. The above relationship limited by the term "and/or" between the M-DRB establishment procedure and U-DRB establishment procedure means an M-DRB establishment procedure, or a U-DRB establishment procedure, or both the M-DRB establishment procedure and a U-DRB establishment procedure. Hereafter the same or similar.

Referring to FIG. 5, after receiving an MBS session setup request from the core network (not shown in FIG. 5), the CU of a BS (e.g., the BS 101) may perform a QoS flow to RB mapping and decide to establish a tunnel for a RB. In an embodiment of the present application, the tunnel may be a GTP-U tunnel. The tunnel may be used for data transmission via M-DRB and/or at least one U-DRB, and accordingly, the tunnel may be also referred to a shared tunnel or a common tunnel in some embodiments.

According to some embodiments of the present application, in the tunnel establishment procedure, the CU may generate a bearer context ID. At step 501, the CU may transmit a bearer context ID to the DU of the BS for establishing a tunnel for a RB. The bearer context ID is used to identify a tunnel for a RB and associate the tunnel with at least one of: an M-DRB and at least one U-DRB.

After receiving the bearer context ID, at step 502, the DU may transmit a transport network layer (TNL) information of the tunnel to the CU. In an embodiment, the TNL information of the tunnel is to identify a shared tunnel for data transmission of both the M-DRB and the at least one U-DRB. In another embodiment, the TNL information indicates an internet protocol (IP) address and GTP-U tunnel endpoint identifier (TEID). After the CU receives the TNL information of the tunnel, the tunnel between the CU and the DU is established.

According to an embodiment of the present application, at step 501, the CU may transmit the bearer context ID in a bearer context setup request message to the DU. After receiving the bearer context setup request message, as a response, at step 502, the DU may transmit a bearer context setup response message to the CU, which includes the TNL information of the tunnel. According to another embodiment of the present application, the bearer context setup request message further indicates at least one of: an MBS session ID, a temporary mobile group identity (TMGI), an ID of the RB, and quality of service (QoS) parameter(s) for the RB.

According to some other embodiments of the present application, the bearer context ID may be generated by the DU in a tunnel establishment procedure. In these embodiments, at step 501, the CU may transmit a bearer context setup request message to the DU. The bearer context setup request message does not include the bearer context ID, which is used to indicate to the DU to generate a bearer context ID and establish a tunnel between the CU and the DU. In an embodiment of the present application, the bearer context setup request message further indicates at least one of: an MBS session ID; a TMGI; an ID of the RB; and QoS parameter(s) for the RB.

After receiving the bearer context setup request message, as a response, at step 502, the DU may transmit a bearer context setup response message to the CU. In an embodiment, the bearer context setup response message may include a bearer context ID and TNL information of the tunnel. In another embodiment, the bearer context ID is indicated in TNL information of the tunnel, for example, the TNL information may be used as the bearer context ID. In this embodiment, the bearer context setup response message may include the TNL information of the tunnel as the bearer context ID. In yet another embodiment, the TNL information indicates an IP address and a GTP-U TEID. After the CU receives the TNL information of the tunnel, the tunnel between the CU and the DU is established.

According to some embodiments of the present application, after establishing the shared tunnel, the CU may transmit a bearer setup request message including the bearer context ID generated in the above tunnel establishment procedure to the DU for establishing an M-DRB for an area including at least one cell and/or a U-DRB for a specific UE.

According to an embodiment of present application, the bearer setup request message may indicate a multicast area including at least one cell for the M-DRB.

According to another embodiment of present application, the bearer setup request message may include an indication indicating whether a PTP mode, and/or a SC-PTM mode or MC-PTM mode is used. For example, the bearer setup request message may include an indication indicating a PTP mode is used for a specific UE. In another example, the bearer setup request message may include an indication indicating a SC-PTM mode is used for a multicast area. In yet another example, the bearer setup request message may include an indication indicating a MC-PTM mode is used for a multicast area. In yet another example, the bearer setup request message may include an indication indicating a PTP mode is used for a specific UE and a SC-PTM mode is used for a multicast area. In yet another example, the bearer setup request message may include an indication indicating a PTP mode is used for a specific UE and a MC-PTM mode is used for a multicast area.

According to another embodiment of the present application, the bearer setup request message may include the indication and may indicate a multicast area including at least one cell.

The above embodiments illustrate that the CU determines the mode and/or the multicast area. However, the mode and/or the multicast area may also be determined by the DU.

According to an embodiment of present application, after receiving the bearer setup request message, the DU may determine the multicast area. Then, the DU may transmit a bearer setup response message to the CU. The bearer setup response message may indicate the bearer context ID and a multicast area including at least one cell.

According to another embodiment of present application, after receiving the bearer setup request message, the DU may determine the mode. Then, the DU may transmit a bearer setup response message to the CU. The bearer setup response message may indicate whether a PTP mode is used for a specific UE, and/or a SC-PTM mode or a MC-PTM mode is used for an area.

According to another embodiment of the present application, the bearer setup response message may include the indication and may indicate a multicast area including at least one cell.

In the example of FIG. 5, UE 2 may receive data via an M-MRB (e.g., in the PTM mode). Accordingly, after establishing the tunnel, the DU may establish an M-DRB for UE 2.

In the M-DRB establishment procedure, according to some embodiments, if the CU decides to setup an M-DRB for a cell or for multiple cells, at step 503, the CU may transmit a bearer setup request to the DU. The bearer setup request may include the bearer context ID transmitted or generated in the above tunnel establishment procedure. Based on the bearer context ID, the DU may associate the M-DRB with the shared tunnel. As a response, at step 504, the DU may transmit a bearer setup response message to the CU including the RRC configuration related to the M-DRB. At step 505, the related RRC configuration may be transmitted to the UE 2 by a RRC message or in a multicast control channel (MCCH) of the cell where UE2 locates.

Figure 6:
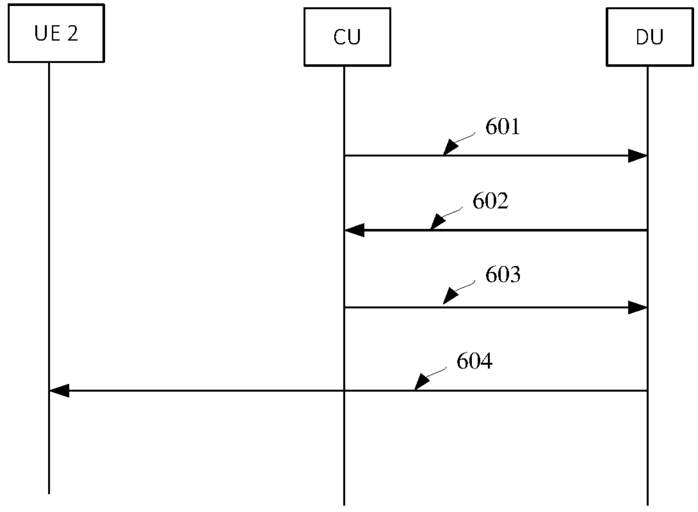
FIG. 6 is a flow chart illustrating a method for M-DRB establishment in SC-PTM mode according to some other embodiments of the present application.

Based on the basic procedure for M-DRB establishment in FIG. 5, more details on a specific M-DRB establishment procedure may be illustrated in FIG. 6.

For example, FIG. 6 is a flow chart illustrating a method for M-DRB establishment according to some other embodiments of the present application.

The M-DRB may be transmitted via two PTM modes, i.e., the SC-PTM mode and MC-PTM mode. In the SC-PTM mode, the BS may schedule the multicast traffic in a single cell via a cell specific G-RNTI. In the MC-PTM mode, the BS may schedule the multicast traffic among multiple cells using the same G-RNTI.

In addition, establishing the M-DRB also involves determining a multicast area including at least one cell (e.g., a list of cells) for the M-DRB.

In the example of FIG. 6, both the CU and the DU can determine the PTM mode and/or a multicast area including at least one cell (e.g., a list of cells).

Referring to FIG. 6, at step 601, the CU may transmit a bearer setup request message including the bearer context ID to the DU, which may be the one used in tunnel establishment procedure.

In some embodiments of the present application, the CU may determine whether a SC-PTM mode or an MC-PTM mode is used and a multicast area including at least one cell for the M-DRB. In these embodiment, the bearer setup request message may include the bearer context ID, a multicast area including at least one cell (e.g., the list of cells), and an indication indicating whether a SC-PTM mode or an MC-PTM mode is used.

In an embodiment of the present application, the CU may determine the SC-PTM mode is used, and thus the bearer setup request message may include the bearer context ID, a multicast area including at least one cell (e.g., a list of cells in the multicast area and/or an M-DRB ID associated with the multicast area including at least one cell), and an indication indicating that a SC-PTM mode is used.

In such an embodiment, after receiving the bearer setup request message, the DU may allocate G-RNTI per cell and generate scheduling information per cell for the M-DRB. Then, at step 602, the DU may transmit the bearer setup response message to the CU. The bearer setup response message may include the bearer context ID, the M-DRB ID, the G-RNTI and scheduling information associated with each cell of the at least one cell in the area. The M-DRB ID may be a logical channel ID (LCID). The U-DRB ID may also be a logical channel ID.

After receiving the bearer context response, the CU may generate a RRC M-DRB configuration for each cell of the at least one cell, wherein the RRC M-DRB configuration indicates the G-RNTI and the scheduling information associated with the cell. Then, at step 603, the CU may transmit the RRC M-DRB configuration for each cell of the at least one cell via a non-UE associated signaling to the DU. After that, at step 604, the DU may transmit the RRC M-DRB configuration to UE 2 via a RRC signaling or may broadcast the RRC M-DRB configuration to UE 2 in an MCCH of the cell where UE2 locates.

In another embodiment of the present application, the CU may determine the MC-PTM mode is used, and the bearer setup request message may include the bearer context ID, a multicast area including at least one cell for the M-DRB, and an indication indicating that an MC-PTM mode is used.

In this embodiment, after receiving the bearer setup request message, the DU may allocate G-RNTI for the area and generate scheduling information for the area. Then, at step 602, the DU may transmit the bearer setup response message to the CU. The bearer setup response message may include the bearer context ID, the M-DRB ID, the G-RNTI and scheduling information associated with the area including at least one cell. In such as embodiment, the G-RNTI and scheduling information associated with the area indicates the same G-RNTI and scheduling information used for the at least one cell within the area.

After receiving the bearer context response, the CU may generate a RRC M-DRB configuration for the area, wherein the RRC M-DRB configuration indicates the G-RNTI and the scheduling information associated with the area. Then, at step 603, the CU may transmit the RRC M-DRB configuration for the area via a non-UE associated signaling to the DU. After that, at step 604, the DU may transmit the RRC M-DRB configuration to the UE 2 via a RRC signaling or may broadcast the RRC M-DRB configuration to the UE 2 in an MCCH of the area.

In some other embodiments, the CU may determine whether a SC-PTM mode or an MC-PTM mode is used but does not determine a multicast area including at least one cell for the M-DRB. Then, the bearer setup request message may include the bearer context ID and an indication indicating whether a SC-PTM mode or an MC-PTM mode. That is, in these embodiments, it is the DU, rather than the CU for determining the multicast area including at least one cell (e.g., a list of cells).

In these embodiments, after receiving the bearer setup request message, the DU itself may determine a multicast area including at least one cell (e.g., a list of cells) which will use the M-DRB mode. Then, at step 602, the DU may transmit a multicast area including at least one cell (e.g., a list of cells in the multicast area and/or an M-DRB ID associated with the multicast area including at least one cell) to the CU.

In addition to determining a multicast area including at least one cell, in the case that the SC-PTM mode is used, the information included in the bearer setup response message and the following steps are the same as the above embodiments for the SC-PTM mode; and in the case that the MC-PTM mode is used, the information included in the bearer setup response message and the following steps are the same as the above embodiments for the MC-PTM mode.

In some other embodiments of the present application, the CU may determine a multicast area including at least one cell for the M-DRB but not determine whether a SC-PTM mode or an MC-PTM mode is used. In such other embodiments, the bearer setup request message may include the bearer context ID, and a multicast area including at least one cell. That is, in these embodiments, the DU determines whether a SC-PTM mode or an MC-PTM mode is used.

In these embodiments, after receiving the bearer setup request message, the DU itself may determine whether a SC-PTM mode or an MC-PTM mode is used, and indicates whether a SC-PTM mode or an MC-PTM mode is used in the bearer setup response message at step 602. In addition to indicating whether a SC-PTM mode or an MC-PTM mode is used in the bearer setup response message, in the case that the SC-PTM mode is used, the information included in the bearer setup response message and the following steps are the same as the above embodiments for the SC-PTM mode; in the case that the MC-PTM mode is used, the other information included in the bearer setup response message and the following steps are the same as the above embodiments for the MC-PTM mode.

In some other embodiments, the bearer setup request message may include the bearer context ID. In these embodiments, the DU needs to determine both a multicast area including at least one cell for the M-DRB and a used mode from the SC-PTM mode and MC-PTM mode.

In an embodiment of the present application, in the case that the SC-PTM mode is used, the DU may determining a multicast area including at least one cell, allocate G-RNTI per cell and generate scheduling information per cell for the M-DRB, and transmit at least one of: the bearer context ID, the multicast area including at least one cell (e.g., a list of cells in the multicast area and/or an M-DRB ID associated with the multicast area including at least one cell), and a G-RNTI and scheduling information associated with each cell of the at least one cell in the area in the bearer setup response message at step 602. The following steps are the same as the above embodiments for the SC-PTM mode.

In another an embodiment of the present application, in the case that the SC-PTM mode is used, the DU may determine a multicast area including at least one cell, allocate G-RNTI for the area and generate scheduling information for the area at step 602. The DU may also transmit at least one of the bearer context ID, the multicast area including at least one cell (e.g., a list of cells in the multicast area and/or an M-DRB ID associated with the multicast area including at least one cell), and the G-RNTI and scheduling information associated with the an area including at least one cell in the bearer setup response message at step 602. In such an embodiment, the G-RNTI and scheduling information associated with the area indicates the same G-RNTI and scheduling information are used for the at least one cell within the area. The following steps are the same as the above embodiments for the MC-PTM mode.

In some other embodiments, it is also possible that the DU broadcasts the G-RNTI and scheduling information to the UE directly without re-routing to the CU after generating the G-RNTI and scheduling information by the DU.

In the example of FIG. 5, UE 1 may receive data via a U-DRB (e.g., in the PTP mode). Accordingly, after establishing the tunnel, the DU may establish a U-DRB for UE 1.

In the U-DRB establishment procedure, according to some embodiments, if the CU decides to setup a U-DRB for a specific UE, at step 506, the CU may transmit an MBS bearer setup request to the DU. The MBS bearer setup request may include the bearer context ID generated in the above tunnel establishment procedure. Based on the bearer context ID, the CU and the DU may associate the U-DRB to the shared tunnel. As a response, at step 507, the DU may transmit an MBS bearer setup response message to the CU including the related RRC configuration. At step 508, the related RRC configurator may be transmitted to the UE 1 by a RRC message.

Figure 7:
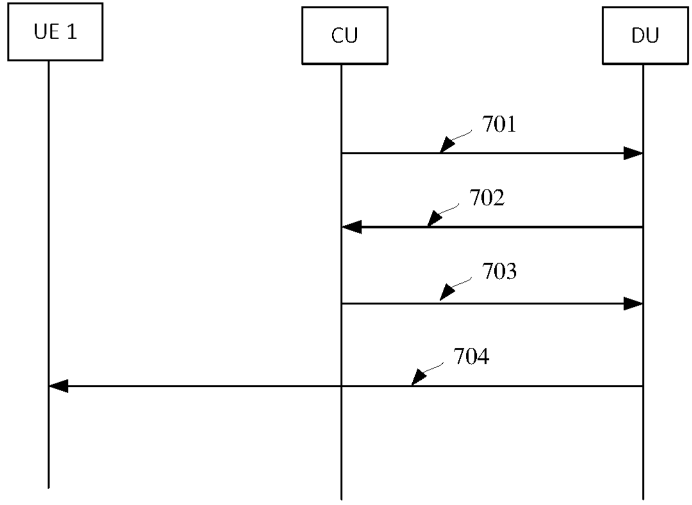
FIG. 7 is a flow chart illustrating a method for D-DRB establishment in MC-PTM mode according to some other embodiments of the present application.

Based on a basic procedure for U-DRB establishment in FIG. 5, the more details on a specific U-DRB establishment procedure may be illustrated in FIG. 7.

For example, FIG. 7 is a flow chart illustrating a method for U-DRB establishment according to some other embodiments of the present application.

Referring to FIG. 7, at step 701, the CU may transmit a bearer setup request message including the bearer context ID, which may be the one used in tunnel establishment procedure.

The PTP mode may be determined by the CU or DU.

In some embodiments, the CU may determine using a PTP mode for a specific UE (e.g., UE 1). Then, the bearer setup request message may indicate a U-DRB ID associated with UE 1. After receiving the bearer setup request message, the DU may generate RRC configuration information for UE1. Then, at step 702, the DU may transmit a bearer setup response message to the CU. The bearer setup response message includes the bearer context ID, the U-DRB ID, and RRC configuration information for UE1.

After receiving the bearer context response, the CU may generate a RRC M-DRB configuration for UE 1, wherein the RRC M-DRB configuration indicates RRC configuration information. Then, at step 703, the CU may transmit the RRC M-DRB configuration for UE 1 via a non-UE associated signaling to the DU. After that, at step 704, the DU may transmit the RRC M-DRB configuration to UE 1 via a RRC signaling.

In some other embodiments, the CU may determine using a PTP mode for a specific UE (e.g., UE 1). In these embodiments, the bearer setup request message may include the bearer context ID. The DU needs to determine whether a SC-PTM mode, an MC-PTM mode, or the PTP mode is used fort UE 1. In the example of FIG. 7, the DU may determine the PTP mode is used for UE 1. Therefore, the DU may generate a U-DRB ID and RRC configuration information for UE1. That is, after receiving the bearer setup request message, at step 702, the DU may transmit a bearer setup response message to the CU. The bearer setup response message includes the bearer context ID, the U-DRB ID, and RRC configuration information for UE1.

After receiving the bearer context response, the CU may generate a RRC M-DRB configuration for UE 1, wherein the RRC M-DRB configuration indicates RRC configuration information. Then, at step 703, the CU may transmit the RRC M-DRB configuration for UE 1 via a non-UE associated signaling to the DU. After that, at step 704, the DU may transmit the RRC M-DRB configuration to UE 1 via a RRC signaling.

After establishing the M-DRB and the U-DRB associated with the tunnel, the CU and DU may perform data transmission via the tunnel. For example, when the CU receives a packet of a QoS flow from the core network, at step 509, the CU may process the packet in a SDAP layer (e.g., performing the QoS flow to RB mapping) and a PDCP layer (e.g. performing security related operation) to generate a PDCP protocol data unit (PDU). At step 510, the CU may transmit the PDCP PDU in the tunnel to the DU. After receiving the PDCP PDU from the tunnel, based on the association between the tunnel and MRB/DRBs, the DU may duplicate the PDCP PDU into at least one PDCP PDU at step 511, and transmit each of the at least one PDCP PDU via the M-DRB associated with the tunnel or the U-DRB associated with the tunnel at step 512.

In the example of FIG. 5, the DU duplicates the PDCP PDU into two PDCP PDUs at step 511, transmits one PDCP PDU to UE 2 via the M-DRB associated with the tunnel and transmits another PDCP PDU to UE 1 via the U-DRB associated with the tunnel at step 512.

As stated above, according to some embodiments of the present application in FIG. 3, the CU of a BS may be separated into a CU-CP unit and a CU-UP unit. In these embodiments, the tunnel may be established between the CU-UP unit and the DU.

Figure 8:
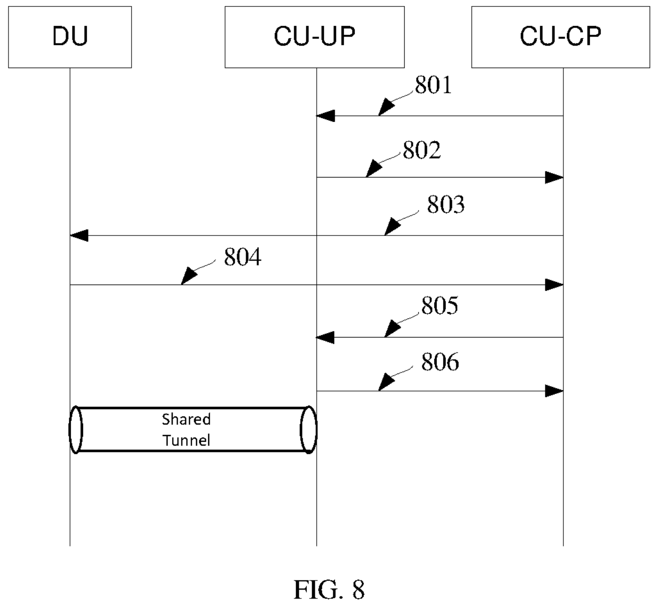
FIG. 8 is a flow chart illustrating a method for tunnel establishment according to some embodiments of the present application.

For example, FIG. 8 is a flow chart illustrating a method for tunnel establishment according to some embodiments of the present application.

In the example of FIG. 8, the BS may include a CU-CP unit, a CU-UP unit, and a DU. After receiving an MBS session setup request from the core network, the CU-CP unit of a BS (e.g., the BS 101) may perform a QoS flow to RB mapping procedure and decide to establish a tunnel for a RB. In an embodiment of the present application, the tunnel may be a GTP-U tunnel. The tunnel may be used for data transmission via M-DRB and/or at least one U-DRB, and accordingly, the tunnel may be also referred to as a shared tunnel or a common tunnel in some embodiments.

The CU-CP unit may generate a bearer context ID for the shared tunnel establishment. In addition, the CU-CP also determines a mapping between at least one QoS flow and a RB.

Then, at step 801, the CU-CP unit may transmit a bearer context ID. The bearer context ID is used to identify a tunnel for a RB and associate the tunnel with at least one of: an M-DRB and at least one U-DRB.

According to some embodiments of the embodiments, after receiving the bearer context ID, as a response, at step 802, the CU-UP unit may transmit the bearer context ID to the CU-CP unit.

In an embodiment of the present application, at step 801, the CU-CP unit may transmit the bearer context ID in a first bearer context setup request message to the CU-UP unit. After receiving the first bearer context setup request message, as a response, at step 802, the CU-UP unit may transmit a first bearer context setup response message to the CU-CP unit, which includes the bearer context ID. In another embodiment of the present application, the first bearer context setup request message further indicates at least one of a mapping between at least one QoS flow and a RB, an MBS session ID, a TMGI, an ID of the RB, and QoS parameter(s) for the RB.

At step 803, the CU-CP unit may transmit the bearer context ID to the DU of the BS for establishing the tunnel between the DU and the CU-UP unit.

After receiving the bearer context ID, at step 804, the DU may transmit TNL information of the tunnel to the CU. In an embodiment, the TNL information of the tunnel is to identify a shared tunnel for data transmission of both the M-DRB and the at least one U-DRB. In another embodiment, the TNL information indicates an IP address and GTP-U TEID.

According to an embodiment of the present application, at step 803, the CU-CP unit may transmit the bearer context ID in a second bearer context setup request message to the DU. After receiving the second bearer context setup request message, as a response, at step 804, the DU may transmit a second bearer context setup response message to the CU, which includes the TNL information of the tunnel. According to another embodiment of the present application, the second bearer context setup request message further indicates at least one of: an MBS session ID, a TMGI, an ID of the RB; and QoS parameter(s) for the RB.

After receiving the TNL information of the tunnel, at step 805, the CU-CP unit may transmit the TNL information to the CU-UP unit. As a response, at step 806, the CU-UP unit may transmit the bearer context ID to the CU-CP unit.

According to an embodiment of the present application, at step 805, the CU-CP unit may transmit the TNL information in a bearer context modification request message to the CU-UP unit. In an embodiment of the present application, the bearer context modification request message may also include the bearer context ID. After receiving the bearer context modification request message, as a response, at step 806, the DU may transmit a bearer context modification response message to the CU, which includes the bearer context ID. After receiving the TNL information of the tunnel by the CU-UP unit, it means that the tunnel between the CU-UP unit and the DU is established.

The example in FIG. 8 illustrates how to establish the tunnel between the CU-UP unit and the DU in the case that the bearer context ID is generated by the CU-UP unit. As stated above, according to some other embodiments, the bearer context ID may be generated by the DU unit.

Figure 9:
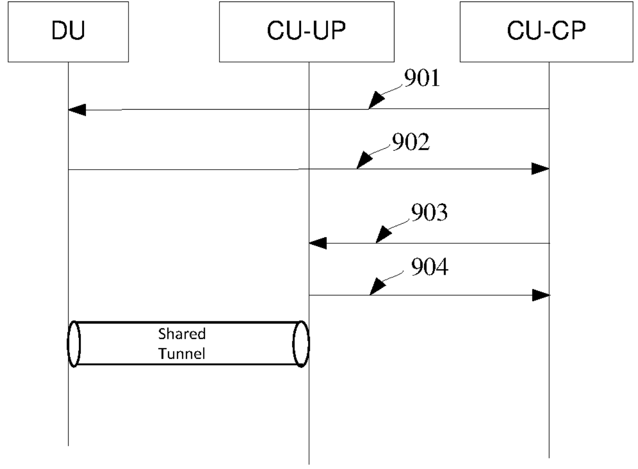
FIG. 9 is a flow chart illustrating a method for tunnel establishment in MC-PTM mode according to some embodiments of the present application.

For example, FIG. 9 is a flow chart illustrating a method for tunnel establishment according to some other embodiments of the present application. In the example of FIG. 9, the bearer context ID may be generated by the DU in a tunnel establishment procedure.

In the example of FIG. 9, the BS may include a CU-CP unit, a CU-UP unit, and a DU. After receiving an MBS session setup request from the core network, the CU-CP unit of a BS (e.g., the BS 101) may perform a QoS flow to RB mapping and decides to establish a tunnel for a RB. In an embodiment of the present application, the tunnel may be a GTP-U tunnel. The tunnel may be used for data transmission via M-DRB and/or at least one U-DRB, and accordingly, the tunnel may be also referred to a shared tunnel or a common tunnel in some embodiments.

In the example of FIG. 9, the bearer context ID may be generated by the DU in a tunnel establishment procedure. For example, at step 901, the CU-CP unit may transmit a first bearer context setup request message to the DU. The first bearer context setup request message does not include the bearer context ID, which is used to indicate to the DU to generate a bearer context ID for the shared tunnel between the CU-UP unit and the DU. In an embodiment of the present application, the first bearer context setup request message further indicates at least one of: an MBS session ID, a TMGI, an ID of the RB, and QoS parameter(s) for the RB.

After receiving the first bearer context setup request message, as a response, at step 902, the DU may transmit a first bearer context setup response message to the CU-CP unit. In an embodiment, the bearer context setup response message may include a bearer context ID and TNL information of the tunnel. In another embodiment, the bearer context ID is indicated in TNL information of the tunnel, for example, the TNL information may be used as the bearer context ID. Therefore, the bearer context setup response message may include the TNL information of the tunnel as the bearer context ID. In yet another embodiment, the TNL information indicates an IP address and a GTP-U TEID.

After receiving the bearer context ID and the TNL information of the tunnel by the CU-CP unit, at step 903, the CU-CP unit may transmit the bearer context ID and the TNL information of the tunnel to the CU-UP unit. In an embodiment of the present application, the CU-CP unit may transmit the TNL information as the bearer context ID in step 903.

After receiving the above information, as a response, at step 904, the CU-UP unit may transmit the bearer context ID to the CU-CP unit.

In an embodiment of the present application, at step 903, the CU-CP unit may transmit the above information in a second bearer context setup request message to the CU-UP unit. After receiving the second bearer context setup request message, as a response, at step 904, the CU-UP unit may transmit a second bearer context setup response message to the CU-CP unit, which includes the bearer context ID. In another embodiment of the present application, the second bearer context setup request message further indicates at least one of: a mapping between at least one QoS flow and a RB, an MBS session ID, a TMGI, an ID of the RB, and QoS parameter(s) for the RB.

After receiving the TNL information of the tunnel by the CU-UP unit, it means that the tunnel between the CU-UP unit and the DU is established.

The above embodiments of the present application relate to establishing a shared tunnel for M-DRB and at least one U-DRB. According to some other embodiments of the present application, the CU may establish separated tunnels for M-DRB and U-DRBs, respectively.

Figure 10:
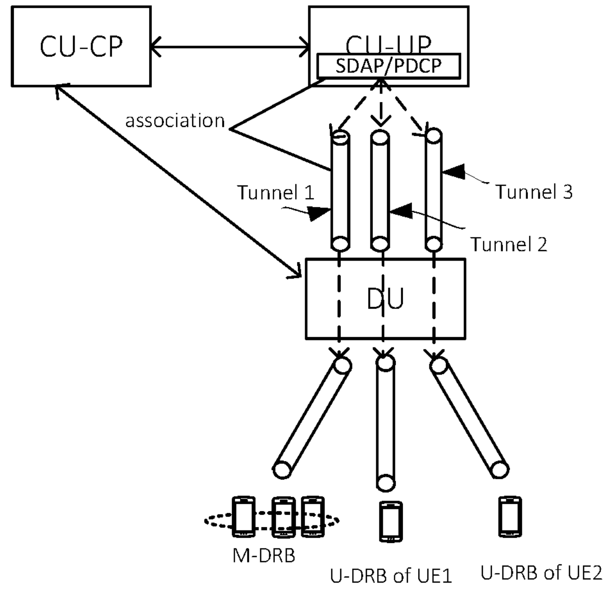
FIG. 10 is a schematic diagram illustrating a data transmission on a tunnel according to some other embodiments of the present application.

For example, FIG. 10 is a schematic diagram illustrating a data transmission on a tunnel according to some other embodiments of the present application.

Referring to FIG. 10, the internal structure of a BS includes a CU-CP unit, a CU-UP unit, and a DU. Tunnel 1 (e.g., a first GTP-U tunnel) may be established between the CU-UP and DU for data transmission via M-DRB, and tunnel 2 (e.g., a second GTP-U tunnel) may be established between the CU-UP and DU for data transmission via U-DRB of UE1 (for example, the UE 102*a*), and tunnel 3 (e.g., a third GTP-U tunnel) may be established between the CU-UP and DU for data transmission via the U-DRB of UE2 (for example, the UE 102*b*).

In the example of FIG. 10, in order to keep service continuity, a common SDAP layer and/or PDCP layer may be associated with the three tunnels (e.g., tunnel 1, tunnel 2, and tunnel 3). The tunnel establishment procedure may be similar as the embodiments shown in FIGS. 8 and 9. Although two U-DRBs of two UEs 102 are depicted in FIG. 10, it is contemplated that any number of U-DRBs may be included in FIG. 10.

In the example of FIG. 10, a data packet is processed in PDCP layer to be a PDCP PDU. The CU-UP unit may duplicate the PDCP PDU into three PDCP PDUs and put the three PDCP PDUs to the three tunnels respectively.

In the example of FIG. 10, the CU-UP unit may be represented by a CU in the case that the CU unit does not split into the CU-CP unit and the CU-UP unit.

Figure 11:
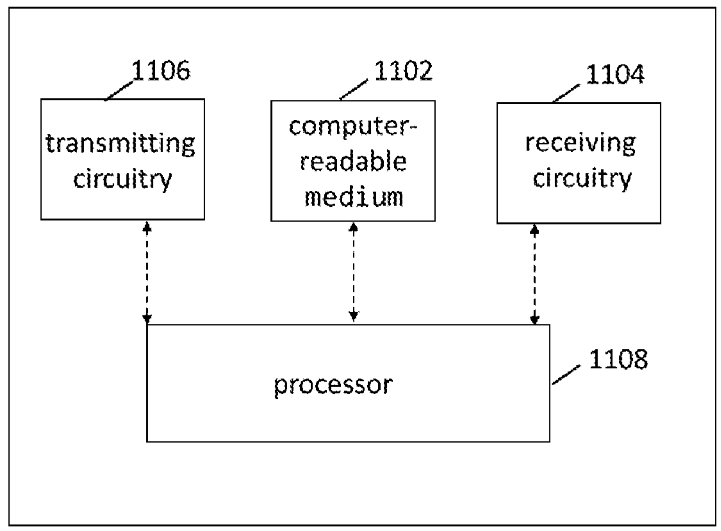
FIG. 11 illustrates a simplified block diagram of an apparatus for MBS according to some embodiments of the present application.

FIG. 11 illustrates a simplified block diagram of an apparatus 1100 for MBS according to some embodiments of the present application. The apparatus 1100 may be a CU or a DU as shown in FIG. 2, or may be a CU-CP unit, a CU-UP unit, or a DU as shown in FIG. 3.

Referring to FIG. 11, the apparatus 1100 may include at least one non-transitory computer-readable medium 1102, at least one receiving circuitry 1104, at least one transmitting circuitry 1106, and at least one processor 1108. In some embodiment of the present application, at least one receiving circuitry 1104 and at least one transmitting circuitry 1106 and be integrated into at least one transceiver. The at least one non-transitory computer-readable medium 1102 may have computer executable instructions stored therein. The at least one processor 1108 may be coupled to the at least one non-transitory computer-readable medium 1102, the at least one receiving circuitry 1104 and the at least one transmitting circuitry 1106. The computer executable instructions can be programmed to implement a method with the at least one receiving circuitry 1104, the at least one transmitting circuitry 1106 and the at least one processor 1108. The method can be a method according to an embodiment of the present application, for example, the method shown in FIGS. 5-9.

The method according to embodiments of the present application can also be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this application. For example, an embodiment of the present application provides an apparatus including a processor and a memory. Computer programmable instructions for implementing a method stored in the memory, and the processor is configured to perform the computer programmable instructions to implement the method. The method may be a method as stated above or other method according to an embodiment of the present application.

An alternative embodiment preferably implements the methods according to embodiments of the present application in a non-transitory, computer-readable storage medium storing computer programmable instructions. The instructions are preferably executed by computer-executable components preferably integrated with a network security system. The non-transitory, computer-readable storage medium may be stored on any suitable computer readable media such as RAMs, ROMs, flash memory, EEPROMs, optical storage devices (CD or DVD), hard drives, floppy drives, or any suitable device. The computer-executable component is preferably a processor but the instructions may alternatively or additionally be executed by any suitable dedicated hardware device. For example, an embodiment of the present application provides a non-transitory, computer-readable storage medium having computer programmable instructions stored therein. The computer programmable instructions are configured to implement a method as stated above or other method according to an embodiment of the present application.

While this application has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the application by simply employing the elements of the independent claims. Accordingly, embodiments of the application as set forth herein are intended to be illustrative, not limiting. Various changes may be made without departing from the spirit and scope of the application.

What is claimed:

1. A method, comprising:

receiving, at a base station, a multicast and broadcast service (MBS) session associated with a quality of service (QoS) flow;

identifying, between a central unit (CU) and a distributed unit (DU) of the base station, a shared tunnel for a radio bearer (RB), the shared tunnel identified by transmitting a bearer context identify (ID) between the CU and the DU;

associating the shared tunnel with: (i) a multicast data radio bearer (M-DRB); and (ii) at least one unicast data radio bearers (U-DRB); and mapping the QoS flow to the M-DRB and the at least one U-DRB to enable the shared tunnel to support multiple transmission modes simultaneously.

2. The method of claim 1, further comprising: receiving, by the CU from the DU, a transport network layer (TNL) information of the shared tunnel.

3. The method of claim 2, wherein:

the bearer context ID that identifies the shared tunnel is included in a bearer context setup request message and the TNL information of the tunnel is included in a bearer context setup response message;

the TNL information indicates an internet protocol (IP) address and a general packet radio service (GPRS) tunneling protocol (GTP) user plane (GTP-U) tunnel endpoint identifier (TEID); and the base station comprises the central unit (CU) separated into a CU control plane (CU-CP) unit communicatively coupled via an E1 interface to a CU user plane (CU-UP) unit, and the base station comprises the DU communicatively coupled to the CU-CP unit via an F1-control (F1-C) interface and coupled to the CU-UP via an F1-user (F1-U) interface.

4. The method of claim 1, wherein the bearer context ID that identifies the shared tunnel is generated in a tunnel establishment procedure.

5. The method of claim 4, wherein the bearer context ID is indicated in TNL information of the tunnel, the TNL information of the tunnel identifying a shared tunnel for data transmission of both the M-DRB and the at least one U-DRB.

6. A base station comprising:

a central unit (CU); and a distributed unit (DU) communicatively coupled to the CU;

at least one non-transitory computer-readable medium having computer executable instructions stored therein;

at least one receiving circuitry;

at least one transmitting circuitry; and at least one processor coupled to the at least one non-transitory computer-readable medium, the at least one receiving circuitry and the at least one transmitting circuitry;

wherein the at least one processor is configured to cause the base station to:

receive, at the base station, a multicast and broadcast service (MBS) session associated with a quality of service (QoS) flow;

identify a shared tunnel, between the CU and the DU, for a radio bearer (RB), the shared tunnel identified by transmitting a bearer context identify (ID) between the CU and the DU;

associate the shared tunnel with: (i) a multicast data radio bearer (M-DRB); and (ii) at least one unicast data radio bearers (U-DRB); and map the QoS flow to the M-DRB and the at least one U-DRB to enable the shared tunnel to support multiple transmission modes simultaneously.

7. The base station of claim 6, wherein the at least one processor is configured to:

receive, at the CU from the DU, transport network layer (TNL) information of the shared tunnel.

8. The base station of claim 7, wherein:

the bearer context ID that identifies the shared tunnel is included in a bearer context setup request message and the TNL information of the tunnel is included in a bearer context setup response message; and the TNL information indicates an internet protocol (IP) address and a general packet radio service (GPRS) tunneling protocol (GTP) user plane (GTP-U) tunnel endpoint identifier (TEID).

9. The base station of claim 6, wherein the bearer context ID that identifies the shared tunnel is generated in a tunnel establishment procedure.

10. The base station of claim 9, wherein the bearer context ID is indicated in TNL information of the tunnel, the TNL information of the tunnel identifying a shared tunnel for data transmission of both the M-DRB and the at least one U-DRB.

11. The base station of claim 7, wherein the bearer context ID that identifies the shared tunnel is transmitted in a bearer setup request message for establishing an M-DRB and/or a U-DRB, and the at least one processor is configured to:

receive a bearer setup response message, wherein the bearer setup response message indicates the bearer context ID and a multicast area including at least one cell.

12. The base station of claim 7, wherein the bearer context ID that identifies the shared tunnel is transmitted in a bearer setup request message for establishing an M-DRB and/or a U-DRB, and the at least one processor is configured to:

receive a bearer setup response message, which indicates whether a point to point (PTP) mode, and/or a single cell point to multipoint (SC-PTM) mode or a multi-cell point to multipoint (MC-PTM) mode is used.

13. The base station of claim 12, wherein:

the bearer setup response message also indicates at least one of: the bearer context ID, the M-DRB ID, and a group radio network temporary identifier (G-RNTI) and scheduling information associated with each cell of at least one cell in an area; and in response to the bearer setup response message indicating the SC-PTM mode is being used, the at least one processor is configured to:

generate a radio resource control (RRC) M-DRB configuration for each cell of the at least one cell, wherein the RRC M-DRB configuration indicates the G-RNTI and the scheduling information associated with the cell; and transmit the RRC M-DRB configuration for each cell of the at least one cell via a non-user equipment (UE) associated signaling.

14. The base station of claim 10, wherein:

the bearer setup response message also indicates at least one of: the bearer context ID, the M-DRB ID, and a group radio network temporary identifier (G-RNTI) and scheduling information associated with an area that includes at least one cell; and in response to the bearer setup response message indicating the SC-PTM mode is being used, the at least one processor:

generates a radio resource control (RRC) M-DRB configuration for the area, wherein the RRC M-DRB configuration indicates the G-RNTI and the scheduling information associated with the area; and transmits the RRC M-DRB configuration for the area via a non-user equipment (UE) associated signaling.

15. A base station comprising:

a central unit (CU) comprising at least one of service data adaptation protocol (SDAP) functionality and packet data convergence protocol (PDCP) layer functionality;

a distributed unit (DU) communicatively coupled to the CU;

at least one non-transitory computer-readable medium having computer executable instructions stored therein;

at least one receiving circuitry;

at least one transmitting circuitry; and at least one processor coupled to the at least one non-transitory computer-readable medium, the at least one receiving circuitry and the at least one transmitting circuitry, wherein the at least one processor is configured to cause the base station to:

receive, at the CU, a multicast and broadcast service (MBS) session;

identify a first tunnel, between the CU and the DU, for a radio bearer (RB), the first tunnel identified by identified by transmitting a bearer context identify (ID) between the CU and the DU;

associate the first tunnel with: a multicast data radio bearer (M-DRB);

identify a second tunnel, between the CU and the DU, for an RB;

associate the second tunnel with at least one unicast data radio bearers (U-DRB); and associate the at least one of the SDAP functionality and the PDCP layer functionality to the first tunnel and the second tunnel to keep service continuity, enabling support of multiple transmission modes simultaneously.

16. The base station of claim 15, wherein the computer executable instructions cause the at least one processor to:

transmit, to the CU from the DU, transport network layer (TNL) information of the tunnel;

wherein the bearer context ID to identify the first tunnel is included in a bearer context setup request message and the TNL information of the tunnel is included in a bearer context setup response message.

17. The base station of claim 15, wherein the bearer context ID to identify the first tunnel is generated in a tunnel establishment procedure.

18. The base station of claim 17, wherein the bearer context ID is indicated in TNL information of the tunnel, the TNL information of the tunnel identifying a shared tunnel for data transmission of both the M-DRB and the at least one U-DRB.

19. The base station of claim 15, wherein the bearer context ID to identify the first tunnel is included in a bearer setup request message for establishing an M-DRB and/or a U-DRB, and the bearer setup request message includes an indication indicating whether a point to point (PTP) mode, and/or a single cell point to multipoint (SC-PTM) mode or a multi-cell point to multipoint (MC-PTM) mode is used.

20. The base station of claim 15, wherein the at least one processor is configured to:

transmit a bearer setup response message, wherein the bearer setup response message indicates whether the point to point (PTP) mode, and/or the single cell point to multipoint (SC-PTM) mode or the multi-cell point to multipoint (MC-PTM) mode is used.

* * * * *